(12) United States Patent
Gensler et al.

(10) Patent No.: US 12,534,200 B1
(45) Date of Patent: Jan. 27, 2026

(54) SUPPRESSION FOR A COUNTERMEASURE DISPENSING SYSTEM

(71) Applicant: BAE Systems Information and Electronic Systems Integration Inc., Nashua, NH (US)

(72) Inventors: Jeffrey A Gensler, Austin, TX (US); Steven L. Dyer, Tyngsborough, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 19/022,636

(22) Filed: Jan. 15, 2025

(51) Int. Cl.
| F42B 12/70 | (2006.01) |
| B64D 1/06 | (2006.01) |
| B64D 7/00 | (2006.01) |
| F41H 11/02 | (2006.01) |

(52) U.S. Cl.
CPC ............... B64D 1/06 (2013.01); B64D 7/00 (2013.01); F41H 11/02 (2013.01); F42B 12/70 (2013.01)

(58) Field of Classification Search
CPC ............ F42B 12/70; F41H 11/02; B64D 1/00
See application file for complete search history.

(56) References Cited

U.S. PATENT DOCUMENTS

| 3,808,940 | A | * | 5/1974 | Schillreff | ............... F41F 3/042 89/1.51 |
| 5,411,225 | A | | 5/1995 | Lannon et al. | |
| 10,330,449 | B2 | | 6/2019 | Fix et al. | |
| 10,486,813 | B2 | | 11/2019 | Zaetterqvist et al. | |
| 10,871,348 | B2 | | 12/2020 | Zätterqvist | |
| 11,845,552 | B2 | | 12/2023 | Zätterqvist | |
| 12,050,094 | B2 | | 7/2024 | Swanepoel | |
| 2013/0167711 | A1 | * | 7/2013 | Zatterqvist | ............... F42B 12/70 89/1.56 |
| 2019/0234718 | A1 | * | 8/2019 | Dube | ............... F42B 5/15 |
| 2022/0390216 | A1 | * | 12/2022 | Hamnett | ............... F42B 12/50 |
| 2022/0397360 | A1 | | 12/2022 | Plemons et al. | |
| 2023/0031637 | A1 | | 2/2023 | Milliorn, Jr. et al. | |
| 2024/0116631 | A1 | | 4/2024 | Kohl et al. | |

FOREIGN PATENT DOCUMENTS

WO 2023075772 5/2023

* cited by examiner

Primary Examiner — J. Woodrow Eldred
(74) Attorney, Agent, or Firm — Sand, Sebolt & Wernow LPA

(57) ABSTRACT

A suppression kit of a countermeasure system and methods of use thereof. The suppression kit includes a breaching expendable that is adapted to be stored inside of a magazine of the countermeasure system. The suppression kit also includes a cover that operably engages with the breaching expendable. The cover is configured to one of suppress electromagnetic signals from penetrating into a dispenser of the countermeasure system, prevent optical or visual view of contents within the countermeasure system, and suppress environmental impacts from entering into the countermeasure system. The breaching expendable is configured to eject the cover from the dispenser prior to ejection of at least one countermeasure expendable of a set of countermeasure expendables.

20 Claims, 11 Drawing Sheets

SUPPRESSION FOR A COUNTERMEASURE DISPENSING SYSTEM

TECHNICAL FIELD

The present disclosure relates to suppression for a countermeasure dispensing system.

BACKGROUND ART

Military platforms, such as a military aircraft, may include at least one countermeasure dispensing system (CMDS). The CMDS may eject one or more countermeasure expendables from the platform to dispense chaff material and/or flares from the platform to counter a detected incoming threat, such as missiles or similar ballistic threats. Such dispensing of chaff material or flares away from the platform may then redirect the incoming threat away from the platform to leave the platform unscathed and/or unharmed. While commonly deployed with military aircraft, commercial aircraft are subject to similar risks and there are various countermeasure systems being deployed for commercial aircraft.

However, in combat, these platforms that are equipped with a CMDS may be vulnerable to enemies using certain detection and/or tracking systems, such as radar or image detection systems. In one example, conventional CMDSs are commonly designed to eject the countermeasure expendables from a platform for countermeasure purposes to protect the platform. However, the exposed CMDS increases the radar cross section of the platform as the platform moves through a space or region that is being subject to radar detection system and may also enable visual view of type and quantity of countermeasures installed. These platforms are also required to flying into environmental stressing conditions (including but not limited to electromagnetic environment, sand, dust, etc.) in which a cover provides protection for countermeasures from the elements.

SUMMARY OF THE INVENTION

The presently disclosed suppression system provides a need in suppressing the opportunity of an electromagnetic signal or similar electromagnetic signal from intercepting and/or detecting the countermeasure system. The presently disclosed suppression system also provides a need in suppressing the opportunity of an electrical signal from intercepting and detecting the countermeasure expendables housed inside of the platform. The presently disclosed suppression system provides a need in suppressing environmental factors including electromagnetic interference from impacting the countermeasure expendables housed inside of the platform. The presently disclosed suppression kit includes a cover that is configured to cover and protect the countermeasure expendables housed inside of the platform from electromagnetic signal or similar electromagnetics trying to intercept and detect the increased radar cross section of the countermeasure system without a cover.

In one aspect, an exemplary embodiment of the present disclosure may provide a suppression kit for a countermeasure system. The suppression kit includes a breaching expendable adapted to be stored inside of a magazine of the countermeasure system; and a cover operably engaged with the breaching expendable. The cover is configured to suppress is configured to suppress one or more of electromagnetic signals, visual views, and environmental signals from penetrating into a dispenser of the countermeasure system. The breaching expendable is configured to eject the cover from the dispenser prior to ejection of at least one countermeasure expendable of a set of countermeasure expendables.

This exemplary embodiment or another exemplary embodiment may further include that the breaching expendable comprises: a first end housed inside of the magazine; and a second end longitudinally opposite to the first end and operably engaged with the cover, wherein the second end is housed inside of the magazine; wherein the cover directly abuts the magazine and the dispenser. This exemplary embodiment or another exemplary embodiment may further include that the breaching expendable comprises: a first end housed inside of magazine; and a second end longitudinally opposite to the first end and operably engaged with the cover, wherein the second end is housed outside of the magazine; wherein the cover directly abuts the dispenser and the magazine is recessed inside of the dispenser. This exemplary embodiment or another exemplary embodiment may further include that the suppression kit further comprises: a retaining mechanism operably engaging the cover and the breaching expendable with one another. This exemplary embodiment or another exemplary embodiment may further include that the suppression kit further comprises: a receiver operably engaged with the breaching expendable; and a connector operably engaging the cover and the breaching expendable with one another. This exemplary embodiment or another exemplary embodiment may further include that the suppression kit further comprises: an opening defined in the cover; and a mating component of the receiver aligned with the cover. This exemplary embodiment or another exemplary embodiment may further include that the connector threadably engages with the receiver. This exemplary embodiment or another exemplary embodiment may further include that the cover is covered with an electromagnetic absorbing material or comprises an electromagnetic absorbing material. This exemplary embodiment or another exemplary embodiment may further include that the suppression kit further comprises: an exterior surface of the cover adapted to be in communication with an exterior environment; an interior surface of the cover opposite to the exterior surface and is free from being in communication with the exterior environment; and a connector extending from the interior surface and engaging the cover and the breaching expendable with one another; wherein the connector is concealed from the exterior environment. This exemplary embodiment or another exemplary embodiment may further include that the cover is configured to be flush with a wall of a platform when installed.

In another aspect, an exemplary embodiment of the present disclosure may provide a suppression kit for a countermeasure system. The suppression kit includes a plurality of breaching expendables adapted to be stored inside of a magazine of the countermeasure system, and a cover operably engaged with each breaching expendable of the plurality of breaching expendables. The cover is configured to suppress is configured to suppress one or more of electromagnetic signals, visual views, and environmental signals from penetrating into a dispenser of the countermeasure system. Each breaching expendable is configured to eject the cover from the dispenser prior to ejection of at least one countermeasure expendable of a set of countermeasure expendables.

This exemplary embodiment or another exemplary embodiment may further include that each breaching expendable of the plurality of breaching expendables comprises: a first end housed inside of the magazine; and a second end longitudinally opposite to the first end and operably engaged with the cover, wherein the second end is housed inside of the magazine; wherein the cover directly abuts the magazine and the dispenser. This exemplary embodiment or another exemplary embodiment may further include that each breaching expendable of the plurality of breaching expendables comprises: a first end housed inside of magazine; and a second end longitudinally opposite to the first end and operably engaged with the cover, wherein the second end is housed outside of the magazine; wherein the cover directly abuts the dispenser and the magazine is recessed inside of the dispenser. This exemplary embodiment or another exemplary embodiment may further include that the suppression kit further comprises: a retaining mechanism operably engaging the cover and the plurality of breaching expendables with one another. This exemplary embodiment or another exemplary embodiment may further include that the suppression kit further comprises: a receiver operably engaged with each breaching expendable of the plurality of breaching expendables; and a connector operably engaging the cover and a respective breaching expendable with one another. This exemplary embodiment or another exemplary embodiment may further include that the cover is covered with an electromagnetic absorbing material or comprises an electromagnetic absorbing material.

In yet another aspect, an exemplary embodiment of the present disclosure may provide a method of protecting a countermeasure system from environmental signals and materials. The method includes steps of: providing a suppression kit to a dispenser of the countermeasure system and to a magazine of the countermeasure system, the suppression kit comprising: a breaching expendable adapted to be stored inside of the magazine of the countermeasure system; and a cover operably engaged with the breaching expendable, wherein the breaching expendable is configured to eject the cover from the dispenser prior to ejection of at least one countermeasure expendable of a set of countermeasure expendables; and protecting the at least one countermeasure expendable, by the cover, from environmental signals and materials.

This exemplary embodiment or another exemplary embodiment may further include steps of positioning a first end of the breaching expendable inside of the magazine; positioning a second end of the breaching expendable inside of the magazine; wherein the second end is longitudinally opposite to the first end; and engaging the second end of the breaching expendable to the cover. This exemplary embodiment or another exemplary embodiment may further include steps of positioning a first end of the breaching expendable inside of the magazine; positioning a second end of the breaching expendable outside of the magazine; wherein the second end is longitudinally opposite to the first end; and engaging the second end of the breaching expendable to the cover; wherein the cover directly abuts the dispenser and the magazine is recessed inside of the dispenser. This exemplary embodiment or another exemplary embodiment may further include a step of engaging the cover and the breaching expendable with one another by a retaining mechanism.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
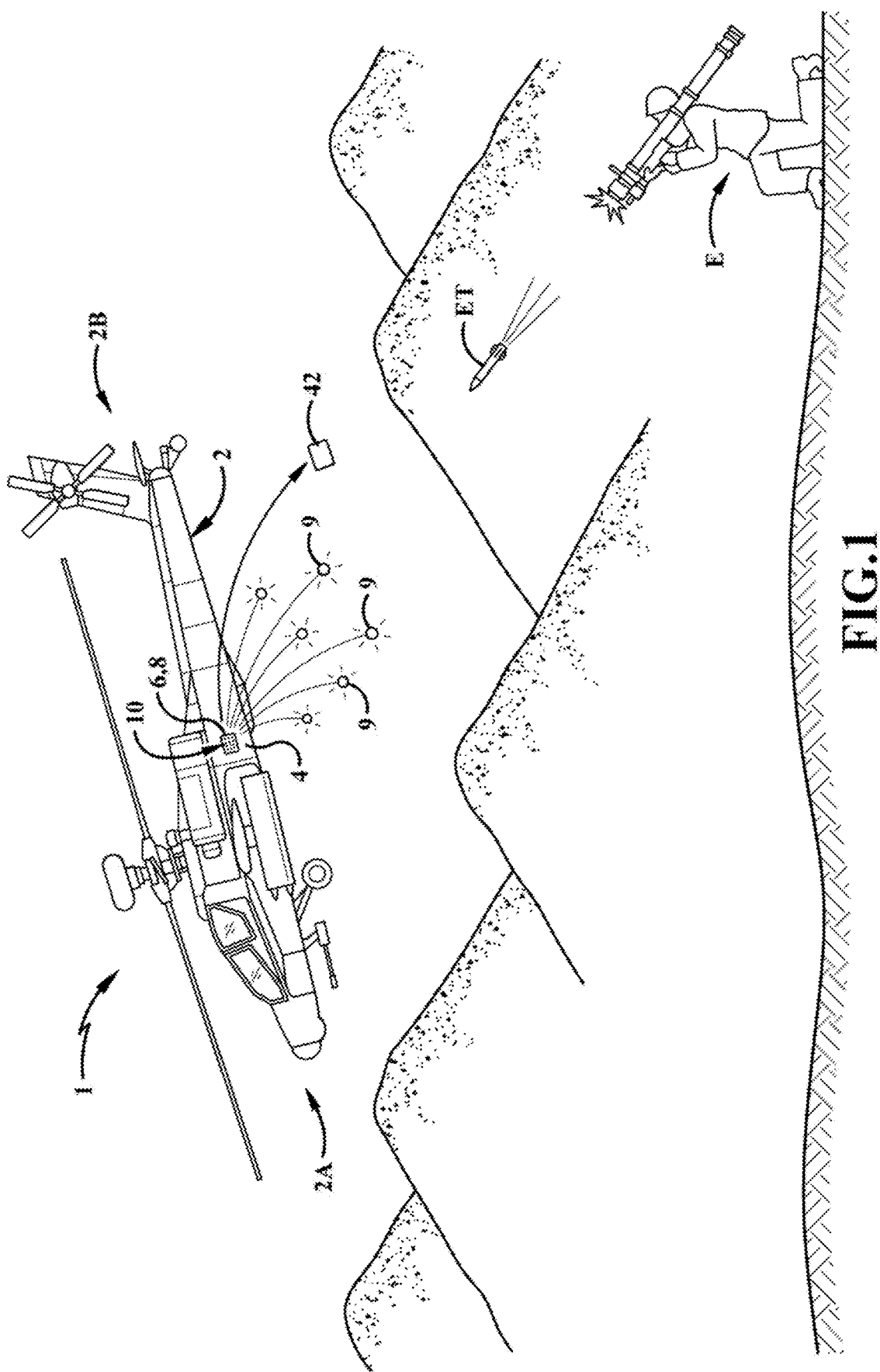
FIG. 1 is a diagrammatic view of a platform equipped with a countermeasure dispensing system (CMDS) for deterring an enemy threat, wherein the CMDS includes a suppression kit in accordance with one aspect of the present disclosure.

FIG. 1 illustrates a platform 1 such as a vehicle, ship, decoy or aircraft, which may be manned or unmanned, that includes a main body 2. As used herein, decoy refers to expendable decoys as well as towed decoys. As used herein, aircraft refers to fixed and rotary wing aircraft as well as UAVs and satellites. The main body 2 has a front end 2A and a rear end 2B longitudinally opposite to the front end 2A. It should be understood that the directions of "front," "rear," "top," "bottom," "right," and "left" are only used as a directional reference for the main body 2 and its associated components and/or parts described herein and illustrated in FIG. 1.

The platform 1 in this example is an aircraft and includes a wall 4 that extends longitudinally between the front end 2A of the main body 2 and the rear end 2B of the main body 2. An opening 6 in the wall 4 is disposed between the front and rear ends 2A, 2B of the main body 2 that may providing access to a chamber defined inside of the platform 1. The opening 6 in the wall 4 is sized and configured for receiving a housing or sleeve of a dispenser assembly of a countermeasure dispensing system 10 ("CMDS"); such housing of a dispenser assembly is discussed in greater detail below.

Figure 3:
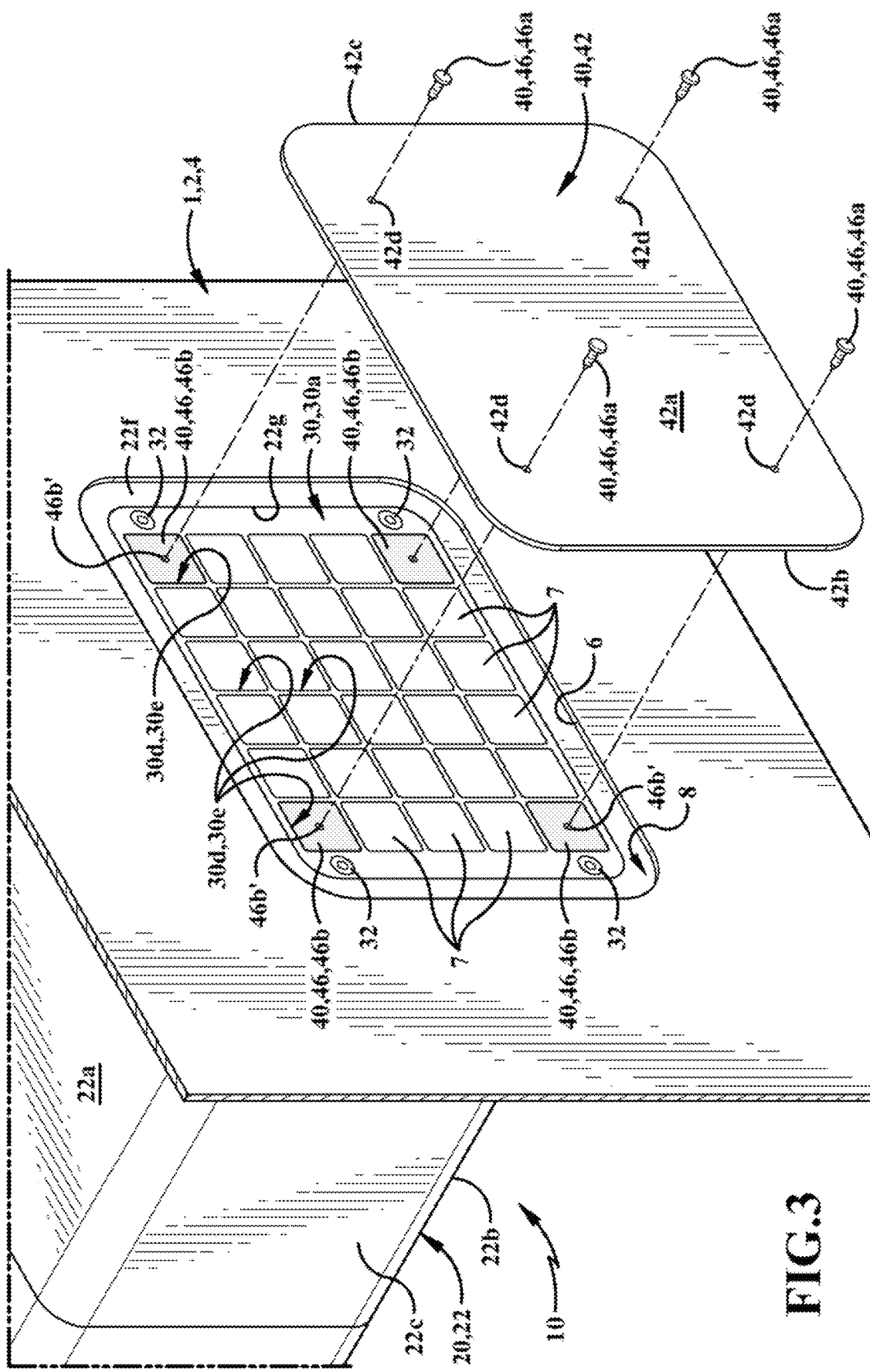
FIG. 3 is an exploded view of the CMDS and the suppression kit, wherein a cover of the suppression kit and a set of connectors of the suppression kit are exploded away from a dispenser and a magazine of the CMDS.
Figure 6A:
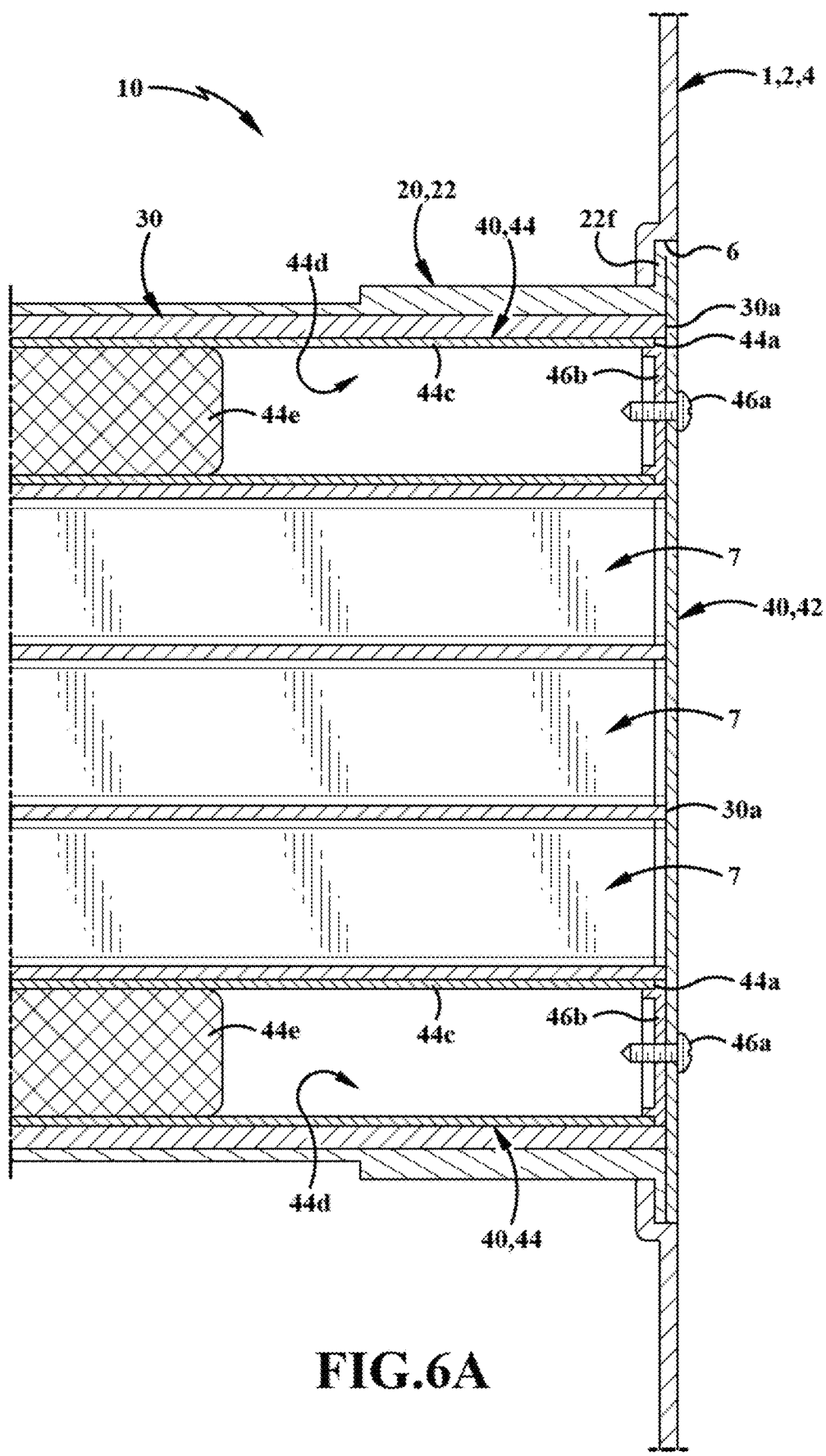
FIG. 6A is an operational view of the CMDS and the suppression kit prior to one or more breaching expendables of the suppression kit ejecting the cover from the platform and the CMDS.
Figure 6B:
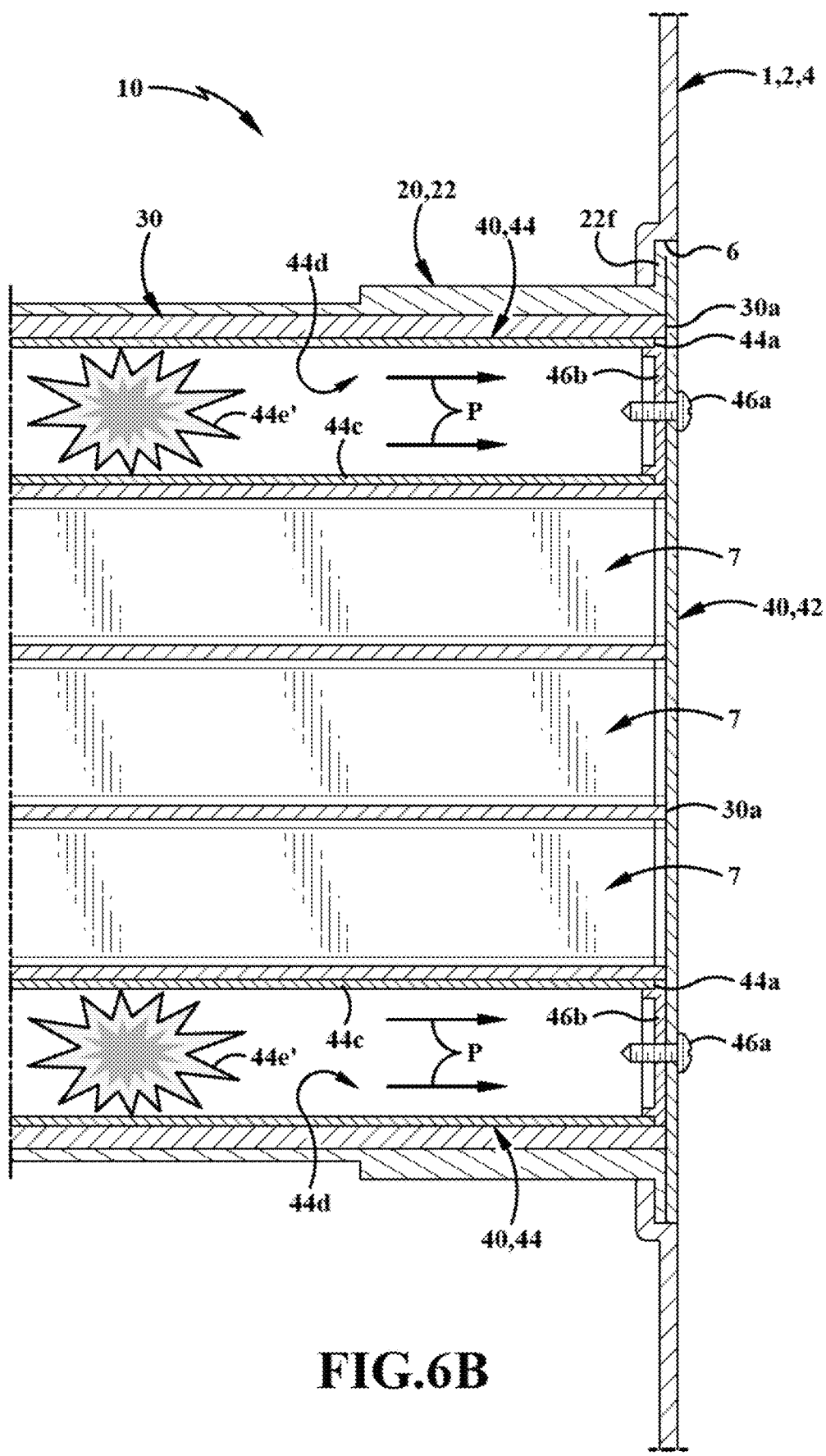
FIG. 6B is another operational view similar to FIG. 6A, but ejection devices of the one or more breaching expendables are ignited and generate propulsion energy.

Prior to military operation or an aerial mission of the platform 1, the CMDS 10 is typically pre-loaded with a plurality of expendables canister 7 (see FIGS. 3 and 6A-6B). Each expendable of the plurality of expendables 7 is loaded with an expendable material 9, such as flare and/or chaff material, for countermeasure purposes. In this countermeasure example, the expendable 7 includes an impulse cartridge (not illustrated) for detonating and dispensing the expendable canister 7 from the platform 1. During operation, the flare and/or chaff material 9 provides a distraction to an incoming enemy threat "ET", initiated by an enemy "E", where the incoming enemy threat "ET" is diverted to the flare and/or chaff material 9 while allowing the platform 1 to remain unscathed. During operation or an aerial mission, the platform 1 may receive a warning such as from an on-board electronic warfare (EW) system or a tracking station regarding the incoming enemy threat "ET" approaching the platform 1. Upon a determination made by the on-board EW system and/or an operator, the CMDS 10 may be activated. In one example the CDMS 10 dispenses an amount of expendables of the plurality of expendables 7 that are disposed underneath, behind, or to the side of the platform 1. In addition, the CMDS 10 may also be provided along any suitable location of the platform 1 other than sidewall 4 of the main body 2. In one exemplary embodiment, a CMDS may be provided within a wing of an aircraft. In another exemplary embodiment, a CMDS may be provided in a fuselage or a pod disposed on an aircraft. In another example the CMDS is located on a towed or expendable decoy.

In this example, a cover 42 of a suppression kit 40 has already been jettisoned from the CMDS 10 exposing the expendables 7 and allowing them to be deployed. Prior to the removal, the cover 42 is designed to cover the CMDS 10 and the expendables 7. The cover 42 material is made to prevent the detection of the CMDS by covering the expendables 7. The cover 42 also aids in the aerodynamics and prevents dust and dirt from interfering with operation of the CMDS. The cover 42 of suppression kit 40 is discussed in greater detail below.

In this example the CMDS 10 is logically powered and controlled by an on-board system. The system may include suitable devices and apparatuses that are operably engaged with one another to logically control and power the CMDSs (such as CMDS 10) described and illustrated herein. In the illustrated embodiments, CMDSs described and illustrated herein may be logically powered and controlled by a legacy on-board system retaining a majority of legacy devices and apparatuses that are operably engaged with and in communication with one another. Examples of legacy devices and apparatuses that may be provided in this system include, but not limited to, a cockpit interface, discrete components, serial buses, a programmer, and data links. In another instance, a CMDS described and illustrated herein may be logically powered and controlled by a new on-board system having new devices and apparatuses that are operably engaged with one another.

Moreover, it will be understood that the on-board system may also retain and use legacy components of legacy CMDSs currently available. In one instance, a CMDS described and illustrated herein may maintain a legacy dispenser along with a legacy wiring harness operably engaging the CMDS with the legacy on-board system. In another instance, a CMDS described and illustrated herein may only maintain a legacy wiring harness operably engaging the CMDS with the legacy on-board system. Furthermore, it will be understood that CMDSs described and illustrated herein may also use new components that are not legacy to an aircraft nor a legacy on-board system provided on the aircraft. Such use of legacy and/or new components of CMDSs are described in further details below.

Figure 2:
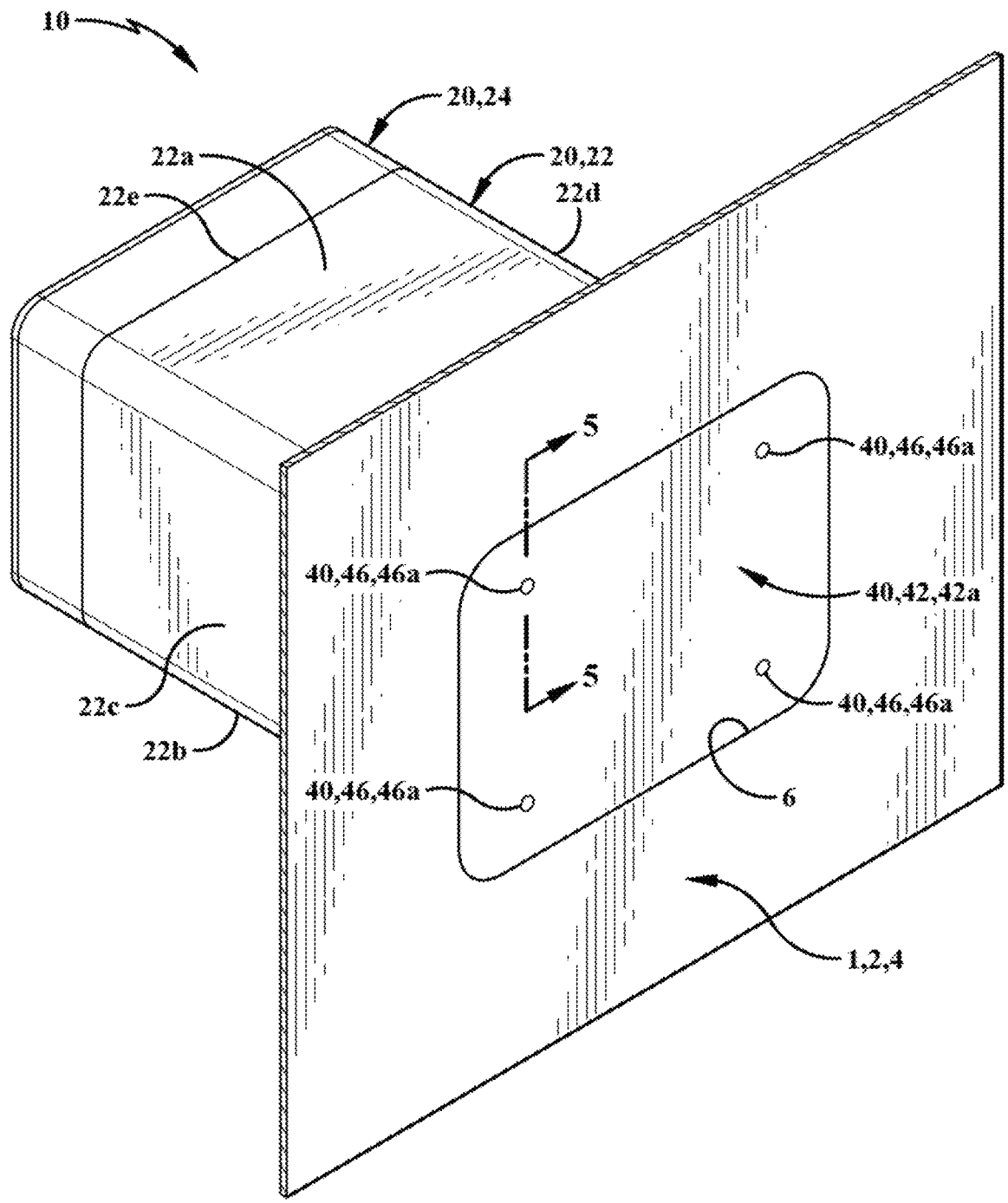
FIG. 2 is a partial perspective view of a sidewall of the platform equipped with the CMDS and the suppression kit.

Referring to FIG. 2. 2, CMDS 10 includes a sleeve or dispenser assembly 20 that operably engages with the main body 2 of platform 1. In operation, dispenser assembly 20 is operable to allow for communications with a sequencer (not illustrated) of CMDS 10 to eject one or more countermeasure expendables of the plurality of expendables 7 from the CMDS 10. Such features and components of dispenser housing assembly 20 are now discussed in greater detail below.

Dispenser assembly 20 includes a housing 22 that operably engages with the platform 1 inside of the opening 6 defined in the wall 4. It should be understood that housing 22 may also be referred to as "dispenser sleeve" or "dispenser bucket" herein. As best seen in FIG. 2, housing 22 operably engages with the wall 4 of the main body 2 to mechanically couple the dispenser of the CMDS 10 to the platform 1. In FIG. 2, the housing 22 is in line with the wall 4 of the main body 2 such that the housing 22 is even or flush with the mold line of the platform 1 to create a continuous, uninterrupted surface for aerodynamic purposes. While the housing 22 in this example is shown being engaged with or on a wall of an aircraft, the housing 22 of dispenser assembly 22 may be located at various locations such as the underside or bottom wall of the platform 1 or any other suitable wall of the platform. In one example, a housing of a dispenser assembly discussed herein may be mounted under the wing or body of a fixed wing aircraft.

As best seen in FIGS. 2-3, the housing 22 includes a top wall 22a, a bottom wall 22b vertically opposite to the top wall 22a, and a vertical axis defined therebetween. The housing 22 also includes a pair of side walls (first side wall 22c and second side wall 22d) that are transversely opposite to the one another and defines a transverse axis therebetween. The housing 22 also includes a rear wall 22e that is longitudinally behind the top wall 22a, the bottom wall 22b, the first side wall 22c, and the second side wall 22d (see FIG. 2), and a flange 22f (see FIG. 5) that is longitudinally opposite to the rear wall 22e. In the present disclosure, the flange 22f is also operably engaged with each of the top wall 22a, the bottom wall 22b, the first side wall 22c, and the second side wall 22d and extends away from top wall 22a, the bottom wall 22b, the first side wall 22c, and the second side wall 22d. The flange 22f is also configured to engage with the wall 4 of main body 2 around the opening 6 defined in the wall 4.

Figure 5:
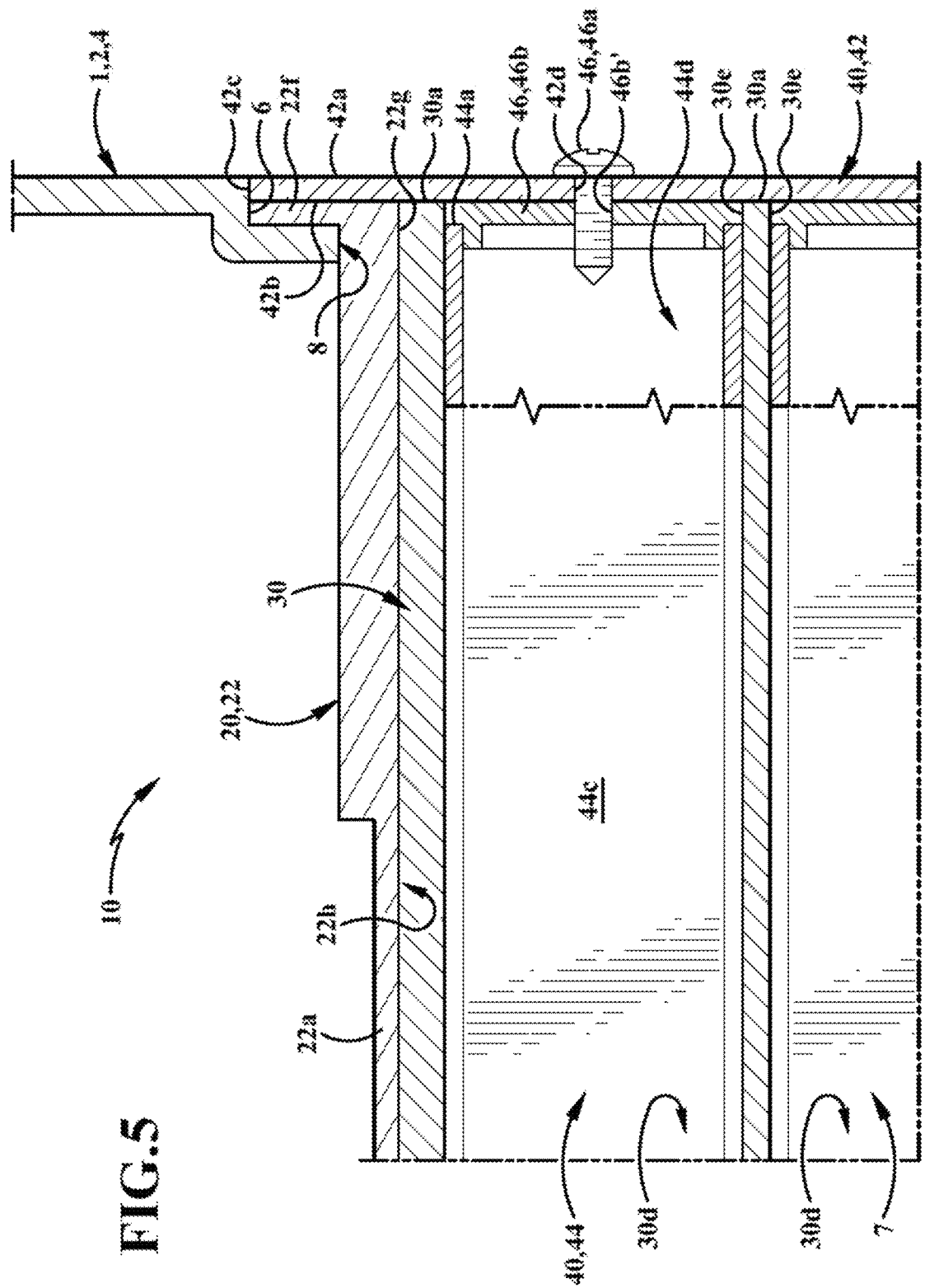
FIG. 5 is a sectional view of the CMDS and the suppression kit taken in direction of line 5-5 shown in FIG. 2.

Referring to FIG. 5, the housing 22 also defines an opening 22g that provides access into a chamber or cavity 22h formed by the housing 22. Specifically, the top wall 22a, the bottom wall 22b, the first side wall 22c, the second side wall 22d collectively define the opening 22g, and the top wall 22a, the bottom wall 22b, the first side wall 22c, the second side wall 22d, and the rear wall 22e collectively define the chamber 22h. As discussed in greater detail below, the chamber 22h is configured to receive a magazine of the CMDS 10 that supports the plurality of countermeasure expendables 7.

In one exemplary embodiment, housing 22 may define a set of attachment apertures in the pair of side wall 22c, 22d or in the rear wall 22e. In this embodiment, a set of fastening mechanisms of dispenser assembly 20 may extend through the set of attachment apertures in order to secure the housing 22 to the main body 2 inside of the opening 6. In one exemplary embodiment, each fastening mechanism of the set of fastening mechanism is a connector or bolt that passes through a respective attachment aperture of the set of attachment apertures to secure the housing 22 to the main body 2 inside of the opening 6.

It should be understood that housing 22 may be any suitable housing, bucket, or dispenser sleeve of an existing CMDS or next generation CMDS. In one exemplary embodiment, the housing 22 may be a legacy AN/ALE-47 dispenser used in a standard AN/ALE-47 CMDS.

Referring again to FIG. 2, CMDS 10 also includes a breechplate assembly 24 that operably engages with the dispenser assembly 20 and the magazine 30. Particularly, the breechplate assembly 24 operably engages with the rear wall 22e of the housing 22 of the dispenser assembly 20. In the present disclosure, the breechplate assembly 24 in configured with a finite number of firing lines and a matching number of fire pins to ignite and eject one or more countermeasure expendables of the plurality of countermeasure expendables 7 in a magazine of CMDS 10. It should be noted that breechplate assembly 24 is also operable with a sequencer of CMDS 10 in order to ignite and eject one or more countermeasure expendables of the plurality of countermeasure expendables 7 during a military operation.

Figure 4:
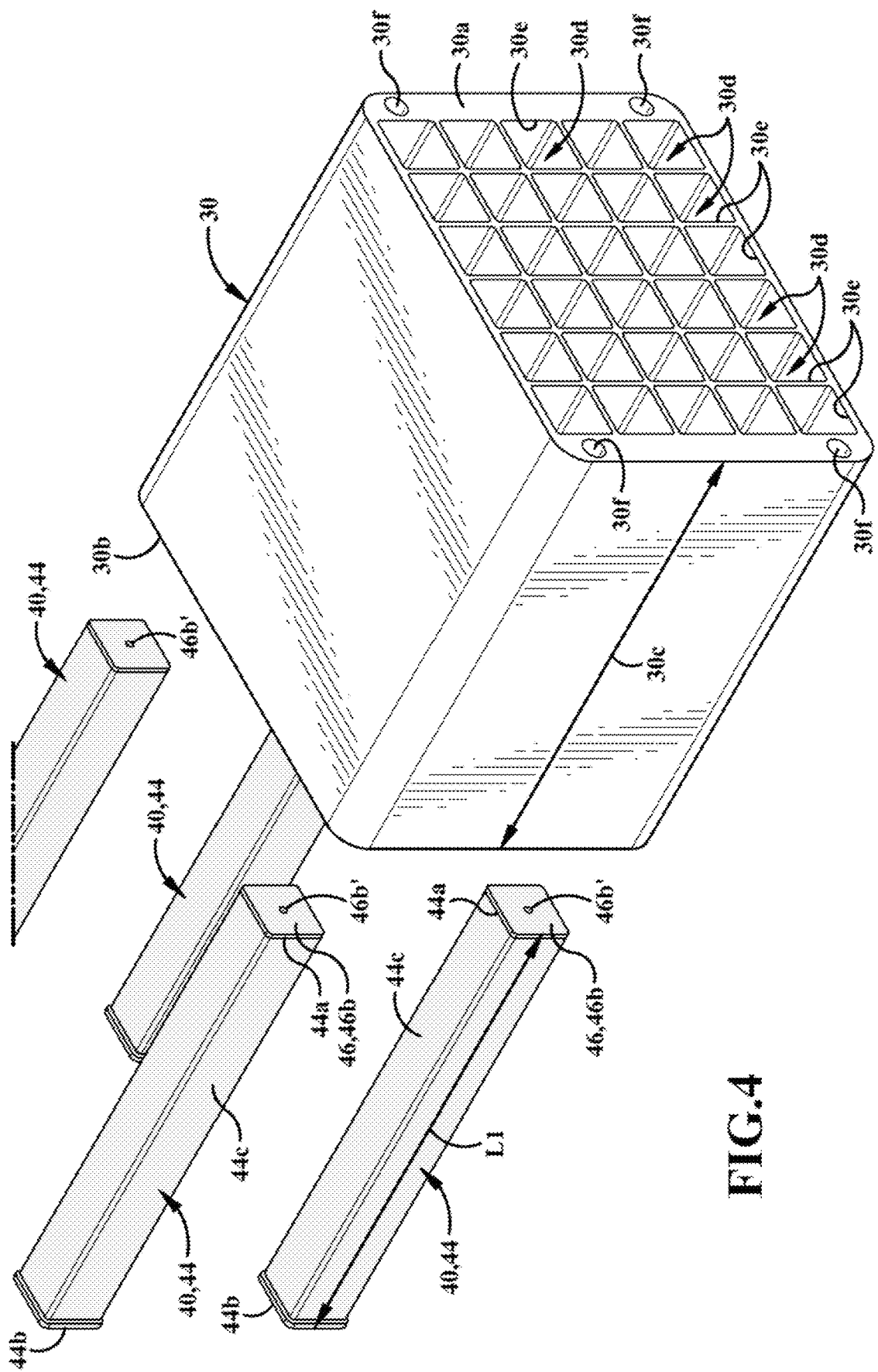
FIG. 4 is an exploded view of the magazine and a set of breaching expendables of the suppression kit in accordance with one aspect of the present disclosure.

Referring to FIGS. 3 and 4, CMDS 10 also includes a magazine 30 that operably engages with the dispenser assembly 20. In the present disclosure, the magazine 30 is fully contained inside of the housing 22 of dispenser assembly 20 in which the magazine 30 is even with the wall 4 or interior to the wall 4. The magazine 30 is coupled to the housing 22 of dispenser assembly 20 by a set of securing mechanisms 32 (see FIG. 3). Such components and parts that make up the magazine 30 are described in more detail below.

Referring to FIG. 4, magazine 30 includes a front wall 30a that faces in the same direction of flange 22f of housing 22, a rear wall 30b that is longitudinally opposite to the front wall 30a and faces in the same direction of rear wall 22e of housing 22, and a longitudinal axis defined therebetween. Magazine 30 also defines a length 30c that is measured between the front wall 30a and the rear wall 30b. Based on the structural configuration of CMDS 10, the length 30c of magazine 30 is less than or equal to the overall length of the housing 22 of the dispenser 20 that is measured between the rear wall 22e and the flange 22f of the housing 22.

Still referring to magazine 30, magazine 30 also defines a set of passageways 30d that extends longitudinally between the front wall 30a and the rear wall 30b. As such, the front wall 30a of the magazine 30 and the rear wall 30b of the magazine 30 are in communication with one another at each passageway of the set of passageways 30d. In one illustrated embodiment, and as best seen in FIG. 3, the magazine 30 defines thirty passageways 30d to load and house a plurality of countermeasure expendables 7 for CMDS 10. As described above, the breechplate assembly 24 enables CMDS 10 to accommodate and dispense up to thirty countermeasure expendables 7 or door breach charges 44. The set of passageways 30d is accessible via a rear set of apertures (not illustrated herein) defined at the rear wall 30b of the magazine 30 and a front set of apertures 30e defined at the front wall 30a of the magazine 30. With such structural configuration of the magazine 30, an operator is enabled to load each countermeasure expendable 7 and one or more door breach charges or breaching expendables of a suppression kit (discussed below) into the set of passageways 30d at the rear set of apertures while the front set of apertures 30e enables each countermeasure expendable 7 to dispense countermeasure material (e.g., flare material, chaff material, and other countermeasure material of the like) from the magazine 30.

In the present disclosure, magazine 30 is configured to receive and store countermeasure expendables 7 that have an approximate one-inch by one-inch dimension. In other exemplary embodiments, a magazine discussed herein may define any suitable number passageways to accommodate and dispense one or more types of countermeasure expendables having varying dimensions. In one exemplary embodiment, a magazine may be configured to receive and store countermeasure expendables that have a one-inch by one-inch dimension and a one-inch by two-inch dimension. In one exemplary embodiment, a magazine may be configured to receive and store countermeasure expendables that have a one-inch by one-inch dimension, a one-inch by two-inch dimension, and a two-inch by two-and-one-half-inch dimension.

Magazine 30 also defines a set of attachment openings 30f. In the present disclosure, each attachment opening of the set of attachment openings 30f is defined between the front wall 30a and the rear wall 30b. With such set of attachment openings, the front wall 30a and the rear wall 30b are in communication with one another at each attachment openings of the set of attachment openings 30f. The set of attachment openings 30f is also configured to receive a set of connectors or bolts 32 so that the magazine 30 is secured to the housing 22. In one example, connectors or bolts 32 extend thru the set of attachment openings 30f of magazine 30 to secure the magazine 30 to the housing 22 of the dispenser 20. The rear 22b of the housing 22 has mating receptacles (not shown) on the housing 22 to receive the connectors 32 so that the magazine 30 is secured to the housing 22.

Referring to FIG. 3 and FIG. 4, CMDS 10 includes a suppression kit or system 40. In the present disclosure, the suppression kit 40 operably engages with one or both of the housing 22 and the magazine 30. Particularly, the suppression kit 40 covers the opening 22g of housing 22 and the front wall 30a of magazine 30. In operation, the suppression kit 40 helps to suppress the opportunity of an electromagnetic signal or similar electromagnetic signal from detecting the platform 1 and the increased radar cross section from the plurality of countermeasure expendables 7 housed inside of the magazine 30. The suppression kit 40 may also reduce or suppress the opportunity of an optical or visual signal from intercepting and detecting the plurality of countermeasure expendables 7 housed inside of the magazine 30. The suppression kit 40 may also suppress environmental factors, including electromagnetic interference, from impacting the plurality of countermeasure expendables 7 housed inside of the magazine 30. The components of the suppression kit 40 are now discussed in greater detail below.

Suppression kit 40 includes a cover 42 that shields the front wall 30a of magazine 30 from the exterior environment surrounding the platform 1. As best seen in FIG. 3, cover 42 includes an exterior or first surface 42a that faces away from the housing 22 and the magazine 30 and is adapted to interface with the exterior environment surrounding the platform 1. Cover 42 also includes an interior or second surface 42b that is opposite to the exterior surface 42a; the interior surface 42b faces into the chamber 22h of housing 22 and the front wall 30a of magazine 30 and is free from interfacing with the exterior environment surrounding the platform 1. Cover 42 also includes a peripheral wall 42c that extends between the exterior surface 42a and the interior surface 42b. Upon assembly, peripheral wall 42c is even with a peripheral edge of wall of flange 22f of housing 22.

Still referring to cover 42, cover 42 may also defines at least one opening 42d. In the present disclosure, cover 42 defines a set of openings 42d that extends entirely through the cover 42. As such, the exterior surface 42a and the interior surface 42b are in communication with one another at each opening of the set of openings 42d. As discussed in greater detail below, each opening of the set of openings 42d may be configured to receive a connector of a retaining mechanism of suppression kit 40 that extends through the cover 42 to secure the cover 42 to a breaching expendable or a door breach charge of suppression kit 40.

A cover 42 is shown coupled to the CMDS 10 such that the cover 42 provides for a smoother exterior surface for the wall 4. When the cover 42 is engaged to at least one breaching expendable or door breach charge, the wall 4 and the cover 42 define a continuous, uninterrupted surface along the platform 1. While the radar absorbing cover 42 is in place, the radar cross section is reduced. In one embodiment the cover 42 comprises radar absorbing material or RF reduction materials may include, but not be limited to, materials such as graded resistive films, loaded cores and fibers, radar absorbent material (RAM), variable graded absorbers, or ceramics. In another embodiment, the cover 42 may have a coating on the exterior surface 42a such as radar absorbing material or RF reduction materials which may include, but not be limited to, graded resistive films, loaded cores and fibers, radar absorbent material (RAM), variable graded absorbers, or ceramics that absorbs emitted radar signals at the platform 1. Additionally, examples of environmental protection materials applied to or use for cover 42 may include, but not be limited to, materials such as chemical coat, anodization, or paint.

As shown in FIG. 4, there is at least one breaching expendable or door breach charge 44 of suppression kit 40 that operably engages with the cover 42. In the present disclosure, suppression kit 40 includes a set of breaching expendables 44 that are loaded into magazine 30. Each breaching expendable 44 includes a first or front end 44a that faces towards the cover 42, a second or rear end 44b that is longitudinally opposite to the first end 44a and faces towards the breechplate assembly 24 of dispenser assembly 20, and a tubular wall 44c that extends longitudinally between the first end 44a and the second end 44b.

Figure 6C:
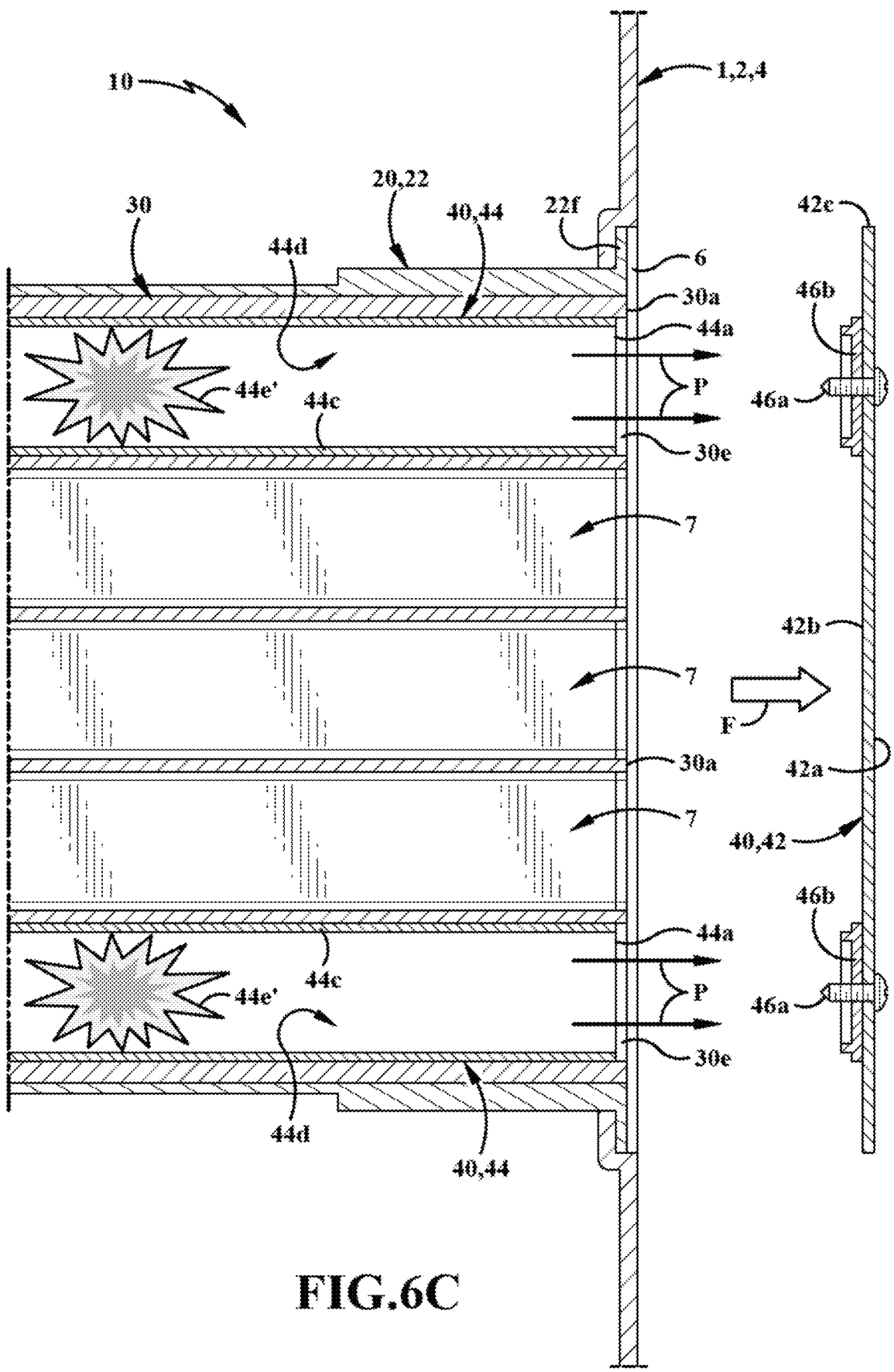
FIG. 6C is another operational view similar to FIG. 6B, but the propulsion energy ejects the cover and one or more receives of retaining mechanisms from the platform and the CMDS.

Still referring to the set of breaching expendables 44, each breaching expendable 44 also defines a chamber 44d between the first end 44a and the second end 44b (see FIGS. 6A-6C). Additionally, each breaching expendable 44 also includes an ejection device 44e that is housed inside of the chamber 44d for ejecting the breaching expendable 44 from the magazine 30. As discussed in greater detail below, the ejection device 44e includes a predetermined amount of explosive material or propulsion material to eject the cover 42 from the wall 4 of the platform 1 and the CMDS 10, particularly the housing 22 and/or the magazine 30. It should be understood that such ignition and denotation of the ejection device 44e may be initiated by a squib (not illustrated) equipped to the respective breaching expendable 44 upon receiving a signal pulse from fire pin or similar initiation device housed on the breechplate assembly 24.

In the present disclosure, breaching expendable 44 may define a length that is equal to or greater than the length 30c of magazine 30. In one example, and as best seen in FIG. 4, breaching expendable 44 may define a first length (denoted by double arrows labeled "L1") that is measured between the first end 44a and the second end 44b. In this example, the first length "L1" of breaching expendable 44 is equal to or less than the length 30c of magazine 30 such that the first end 44a and the second end 44b of breaching expendable 44 are housed inside of magazine 30. If such breaching expendable 44 is loaded into the magazine 30 for a desired structural arrangement, the cover 42 contacts the front wall 30a of magazine 30 where the front wall 30a of the magazine 30 is even with or flush with the flange 22f of housing 22.

Such inclusion of the breaching expendables 44 is considered advantageous at least because the breaching expendables 44 are used to eject, remove, and disengage the cover 42 from the housing 22 and/or the magazine 30 in order for one or more countermeasure expendables of the plurality of countermeasure expendables 7 to be ejected and dispensed for countermeasure operations. In the present disclosure, the breaching expendable 44 only includes the ejection device 44e that generates propulsion energy against the interior surface 42b to eject and disengage the cover 42 from the housing 22 and/or the magazine 30. As such, the breaching expendable is, in essence, a "blank" expendable that is free from dispensing any countermeasure material into the exterior environment surrounding the platform 1 when the breaching expendable 44 is ignited by a fire pin of the breechplate assembly 24 and ejects the cover 42 away from platform 1. In other exemplary embodiments, it may be desired to include countermeasure material in at least one breaching expendable 44 that is engaged with cover 42 when a desired amount of countermeasure material is needed for a given military operation.

In the present disclosure, at least one breaching expendable 44 is stored inside of one or more of the passageways of the set of passageways 30d. As such, the at least one breaching expendable 44 takes the place of a countermeasure expendable of the plurality of countermeasure expendables 7 in order to eject and disengage the cover 42 from the housing 22 and the magazine 30 as discussed above. In other exemplary embodiments, any suitable number of breaching expendables 44 may be stored inside of the magazine 30 to eject the cover 42 from the housing 22 and/or the magazine 30 during a military operation. In one exemplary embodiment, and as best seen in FIGS. 3-4, four breaching expendables 44 take the place of four countermeasure expendables of the plurality of countermeasure expendables 7 in order to eject and disengage the cover 42 from the housing 22 and the magazine 30. In this exemplary embodiment, each of the four breaching expendables 44 are loaded in corner passageways of the set of passageways 30d that align with the corners of the cover 42; such arrangement of the four breaching expendables 44 may be desired in order to ensure that each quadrant of cover 42 is disengaged simultaneously.

Suppression kit 40 also includes a retaining mechanism 46 that operably engages the cover 42 and the breaching expendable 44 with one another. As best seen in FIG. 5, retaining mechanism 46 includes a connector 46a that passes through a respective opening of the set of openings 42d and engages with a receiver 46b that engages with the first end 44a of a respective breaching expendable 44. In this embodiment, receiver 46b may define a threading or mating member 46b' defined in or on the breaching expendable 44 that is configured to engage with the connector 46a. Such use retaining mechanism 46 maintains the cover 42 with the breaching expendable 44 prior to any countermeasure expendable of the plurality of countermeasure expendables 7 being ejected and dispensed from magazine 30. It should be noted that in one exemplary embodiment, a portion of the connector 46a that is in communication with the exterior surface 42a of cover 42 and with the exterior environment may be covered with an electromagnetic absorbent material similar to the electromagnetic absorbent material of cover 42.

Having now described the components of CMDS 10 as well as the components of suppression systems or kit 40, methods of operating suppression kit 40 from the platform 1 during a countermeasure operation are discussed in greater detail below.

Initially, magazine 30 is loaded with a desired amount of countermeasure expendables 7 based on the military operation. It should be noted that at least one or more passageways of the set of passageways 30*d* defined in the magazine 30 are left open and/or are free from housing a countermeasure expendable 7 to housing one or more breaching expendables 44. It should be noted that magazine 30 can be separate from the dispenser assembly 20 and the platform 1 when countermeasure expendables 7 are loaded into the magazine 30.

Once the desired amount of countermeasure expendables 7 are loaded into the magazine 30, one or more breaching expendables 44 are then loaded into the magazine 30 at the available passageways of the set of passageways 30*d*. In one configuration, and as best seen in FIGS. 3-4, four breaching expendables 44 are loaded into corner passageways of the set of passageways 30*d* of magazine 30 so that each quadrant or corner of cover 42 is engaged with a breaching expendable 44. In this configuration, the first end 44*a* of each breaching expendable 44 is housed inside of the magazine 30 that is even or flush with the front wall 30*a* of magazine 30. Similarly, the second end 44*b* of each breaching expendable 44 is also housed inside of the magazine 30 that is even or flush with the rear wall 30*b* of magazine 30. Such configuration may be desirable when each countermeasure expendable of the plurality of countermeasure expendables 7 that is loaded into the magazine 30 is also fully housed inside of the magazine 30. At this stage, the magazine 30 along with the breaching expendables 44 may then be introduced to housing 22 and cover 42 may be installed.

In other exemplary embodiments, any suitable number of breaching expendables 44 may be loaded into the magazine 30 based on various considerations, including number of countermeasure expendables 7 needed during a military operation, the size, shape, or weight of the cover 42, and other various considerations. In the present disclosure, at least one breechplate expendable 44 may be needed to eject the cover 42 from the magazine 30 to expose the plurality of countermeasure expendables 7.

Once the breaching expendables 44 have been loaded into the magazine 30, the cover 42 may then be introduced and operably engaged with the breaching expendables 44 via retaining mechanisms 46. In the first configuration, and as best seen in FIG. 6A, the interior surface 42*b* of cover 42 rests against the flange 22*f* of housing 22 and the front wall 30*a* of magazine 30 when the cover 42 engages with the breaching expendables 44. When retaining mechanisms 46 are used, connectors 46*a* are passed through the openings 42*d* of cover 42 and engage with the receivers 46*b* (particularly at threading 46*b*') to directly engage the cover 42 with the breaching expendables 44. At this stage, the dispenser 20, the magazine 30, and the suppression kit 40 are equipped to platform 1 are ready for military operation.

Prior to one or more countermeasure expendables 7 being ejected and dispensed, the cover 42 of the suppression kit 40 must be removed. At this stage, each fire pin of the breechplate assembly 24 that is engaged with the breaching expendable 44 sends a pulse to ignite a squib that is equipped to the breaching expendable 44. Upon such pulse, the squib ignites a corresponding ejection device 44*e*' that generates kinetic energy inside of the breaching expendable 44 that is exerted through the tubular wall 44*c* from the second end 44*b* of the breaching expendable 44 to the first end 44*a* of the breaching expendable 44. Such kinetic energy generated by the ignited ejection device 44*e*' is then exerted against the interior surface 42*b* of cover 42 to eject and disengage the cover 42, and the respective receiver 46*b*, from the platform 1; such ejection is denoted by arrows labeled "F" in FIG. 6C. At this stage, one or more countermeasure expendables of the plurality of countermeasure expendables 7 may now be ejected and dispensed into the surrounding environment to provide countermeasure operations for platform 1.

Figure 7:
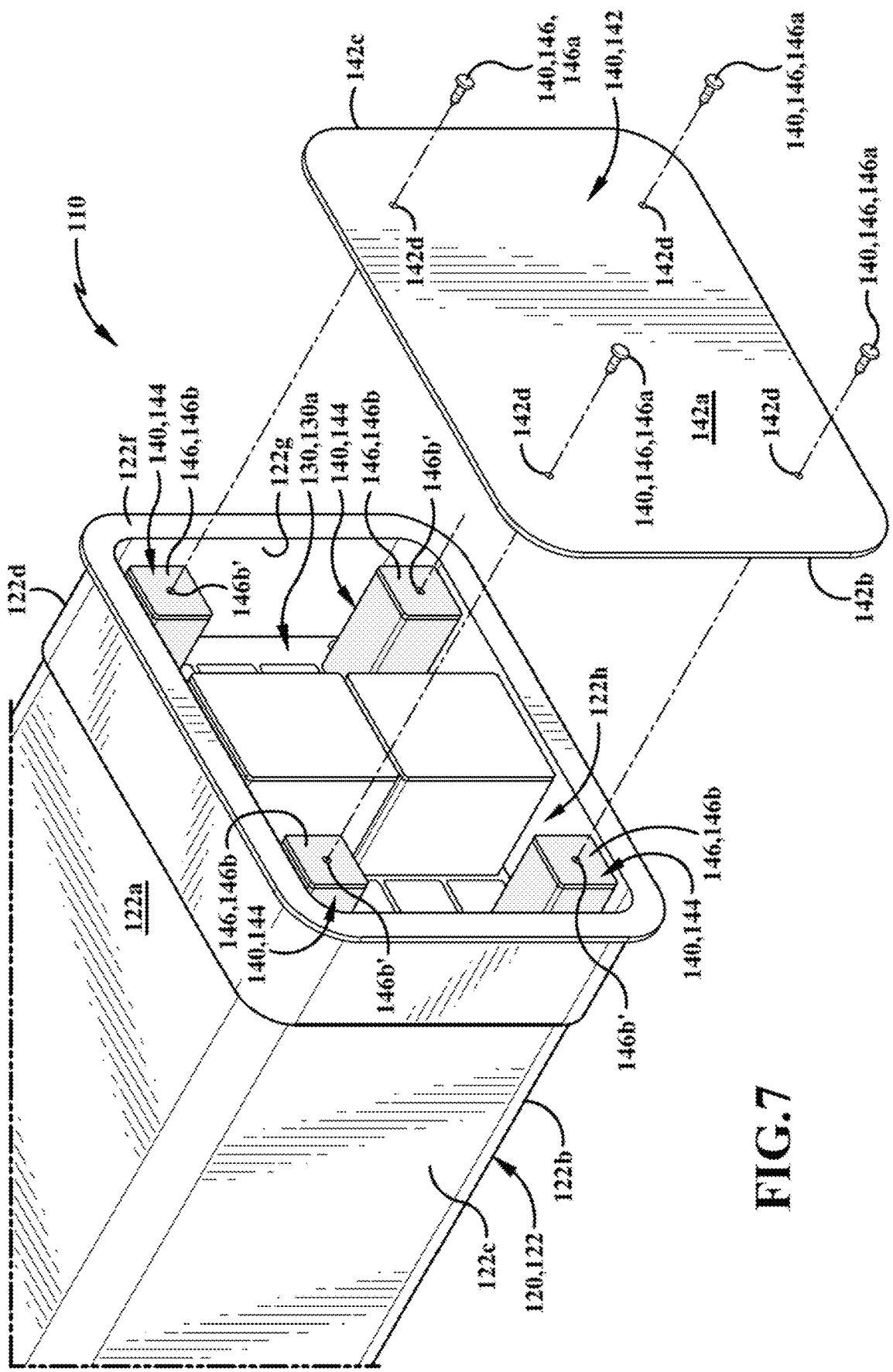
FIG. 7 is a partial exploded view of a CMDS that includes a suppression kit in accordance with another aspect of the present disclosure, wherein the cover of the suppression kit is exploded away from an alternative set of breaching expendables and an alternative dispenser.
Figure 8:
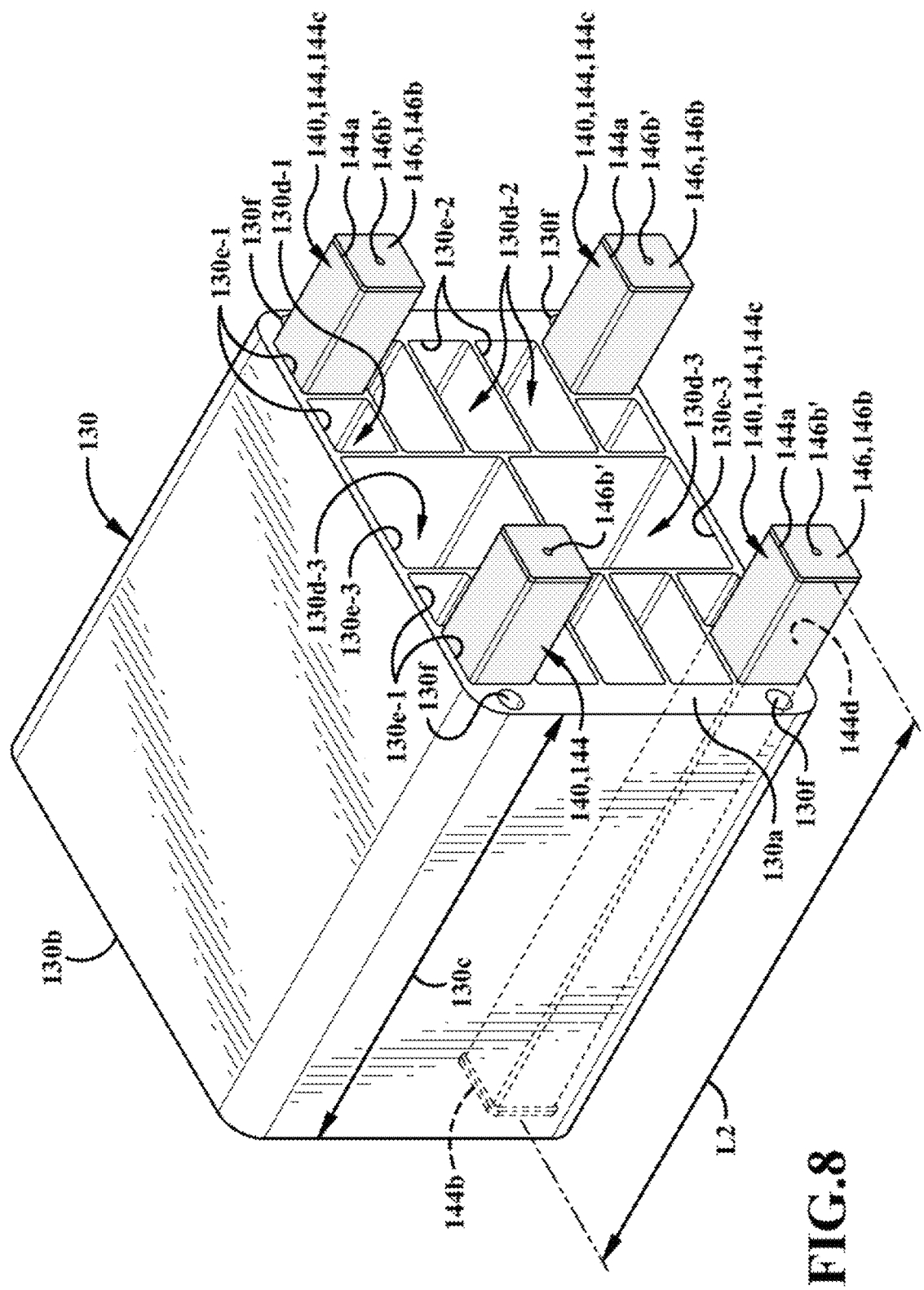
FIG. 8 is a top, front, first side isometric perspective view of a magazine of the CMDS shown in FIG. 7 and the set of breaching expendables shown in FIG. 7.

FIGS. 7-8 illustrate another CMDS 110 that includes a dispenser 120, a magazine 130, and a suppression kit 140. CMDS 100 is similar to CMDS 10 that is discussed above, except as detailed below.

With respect to dispenser 120, dispenser includes a top wall 122*a*, a bottom wall 122*b*, a pair of side walls 122*c*, 122*d*, a rear wall 122*e*, a flange 122*f*, an opening 122*g*, and a chamber 122*h* that are similar to top wall 22*a*, bottom wall 22*b*, pair of side walls 22*c*, 22*d*, rear wall 22*e*, flange 22*f*, opening 22*g*, and chamber 22*h* of housing 22. However, housing 122 defines a length, measured between the rear wall 122*e* and the flange 122*f*, that is greater than a length of housing 22 measured between the rear wall 22*e* and the flange 22*f*. As discussed in greater detail below, such difference in lengths between the housing 22 shown in FIGS. 2-6C and housing 122 shown in FIG. 7 is due to an increased length in countermeasure expendables housed inside of housing 122 and the magazine 130.

With respect to the magazine 130, magazine 130 includes a front wall 130*a*, a rear wall 130*b*, a length 130*c* defined between the front wall 130*a* and rear wall 130*b*, and attachment openings 130*f* that are similar to the front wall 30*a*, the rear wall 30*b*, the length 30*c* of magazine 30, and attachment openings 30*f*. However, magazine 130 defines a set of first passageways 130*d*-1, a set of second passageways 130*d*-2, and a set of third passageways 130*d*-3 as compared to the set of passageways 30*d* of magazine 30. In this embodiment, the passageways of the set of first passageways 130*d*-1, the set of second passageways 130*d*-2, and the set of third passageways 130*d*-3 are defined between the front wall 130*a* and the rear wall 130*b*.

With respect to the set of first passageways 130*d*-1, set of first passageways 130*d*-1 is accessible at a first rear set of apertures (not illustrated herein) defined at the rear wall 130*b* of the magazine 30 and at a first front set of apertures 130*e*-1 defined at the front wall 130*a* of the magazine 130; it should be noted that the first rear set of apertures is identical to the first front set of apertures 130*e*-1. With respect to the set of second passageways 130*d*-2, set of second passageways 130*d*-2 is accessible at a second rear set of apertures (not illustrated herein) defined at the rear wall 130*b* of the magazine 30 and at a second front set of apertures 130*e*-2 defined at the front wall 130*a* of the magazine 130; it should be noted that the second rear set of apertures is identical to the second front set of apertures 130*e*-2. With respect to the set of third passageways 130*d*-3, set of third passageways 130*d*-3 is accessible at a third rear set of apertures (not illustrated herein) defined at the rear wall 130*b* of the magazine 30 and at a third front set of apertures 130*e*-3 defined at the front wall 130*a* of the magazine 130; it should be noted that the third rear set of apertures is identical to the third front set of apertures 130*e*-3.

With such structural configuration of the magazine 130, an operator is enabled to load various types of countermeasure expendable into the sets of passageways 130*d*-1, 130*d*-2, 130*d*-3 at the rear sets of apertures while the front sets of apertures 130*e*-1, 130*e*-2, 130*e*-3 enables each countermeasure expendable to dispense countermeasure material (e.g., flare material, chaff material, and other countermeasure material of the like) from the magazine 130. In this disclosure, the set of first passageways 130*d*-1 is configured to receive a set of first countermeasure expendables 107a, the set of second passageways 130d-2 is configured to receive a set of second countermeasure expendables 107b, and the set of third passageways 130d-3 is configured to receive a set of third countermeasure expendables 107c. Here, the dimensions of the set of third countermeasure expendables 107c are greater than the dimensions of the set of second countermeasure expendables 107b and the set of first countermeasure expendables 107a. Further, the dimensions of the set of second countermeasure expendables 107b are greater than the set of first countermeasure expendables 107a. Such dimensions of the sets of countermeasure expendables 107a, 107b, 107c match with and/or correspond to the dimensions of the sets of passageways 130d-1, 130d-2, 130d-3 defined in the magazine 130.

It should be noted that the sets of countermeasure expendables 107a, 107b, 107c may have any suitable dimensions (i.e., length, width, and height). In one example, and as best seen in FIG. 8, the set of first countermeasure expendables 107a has a one-inch by one-inch dimension, the set of second countermeasure expendables 107b has a one-inch by two-inch dimension, and the set of third countermeasure expendables 107c has a two-inch by two-and-one-half-inch dimension.

With respect to suppression kit 140, suppression kit 140 includes a cover 142, a set of breaching expendables 144, and retaining mechanisms 146 that operably engages the cover and set of breaching expendables 144 with one another. With respect to cover 142, cover 142 includes an exterior surface 142a, an interior surface 142b, a peripheral wall 142c, and a set of openings 142d that are identical to the exterior surface 42a, the interior surface 42b, the peripheral wall 42c, and the set of openings 42d of cover 42 of suppression kit 40. With respect to retaining mechanisms 146, each retaining mechanism 146 includes a connector 146a and a receiver 146b defining a threading or mating member 146b' that operably engages with a respective breaching expendable 144 and with the connector 146a identical to the connector 46a and the receiver 46b that operably engages with a respective breaching expendable 44 and with the connector 46a of retaining mechanism 46.

With respect to the breaching expendables 144, each breaching expendable 144 includes a first end 144a, a second end 144b, a tubular wall 144c extending between the first end 144a and the second end 144b, a chamber 144d, and a ejection device (not illustrated) that is similar to the first end 44a, the second end 44b, the tubular wall 44c extending between the first end 44a and the second end 44b, the chamber 44d, and the ejection device 44e of each breaching expendable 44 of suppression kit 40. However, in this embodiment, each breaching expendable 144 defines a second length (denoted by double arrows labeled "L2") that is measured between the first end 144a and the second end 144b which is greater than the first length "L1" of each breaching expendable 44 discussed above. Additionally, the second length "L2" of breaching expendable 144 is greater than the length 130c of magazine 130 such that the first end 144a of breaching expendable 144 is housed inside of magazine 130 and the second end 144b of breaching expendable 144 is outside of magazine 130 (see FIG. 8). If such breaching expendable 144 is loaded into the magazine 130 for a desired structural arrangement, the cover 142 is spaced apart from the front wall 130a of magazine 130 where the front wall 130a of the magazine 130 is spaced apart from the flange 122f of housing 122. In this arrangement, the magazine 130 is recessed into the housing 122.

In this embodiment, and as best seen in FIG. 8, four breaching expendables 144 may be loaded into corner passageways of the set of first passageways 130d-1 of magazine 130 so that each quadrant or corner of cover 142 is engaged with a breaching expendable 144 by retaining mechanisms 146. In this configuration, the first end 144a of each breaching expendable 144 is housed outside of the magazine 130 such that the first end 144a is ahead of or in front of the front wall 130a of magazine 130. However, the second end 144b of each breaching expendable 144 is also inside of the magazine 130 that is even or flush with the rear wall 130b of magazine 130. Such configuration may be desirable when one or more countermeasure expendables of the sets of countermeasure expendables, specifically set of third countermeasure expendables 107c, are loaded into the magazine 130 and extends outside of the magazine 30 (see FIG. 7). As such, the magazine 130 is recessed into the housing 122 in which the front wall 130a of magazine 130 is positioned inside of the chamber 122h at a distance away from the flange 122f in this configuration. At this stage, the magazine 130 along with the breaching expendables 144 may be introduced to housing 122 and cover 142 may be installed if used on platform 1.

Suppression kits 40, 140 may also include an alternative retaining mechanism that also operably engages the cover 42 and the breaching expendable 44 with one another. In this embodiment, however, each alternative retaining mechanism includes a connector that is similar to function of connectors 46a, 146a but extends outwardly from the interior surface 42b of cover 42. As such, alternative connector may be integral with the interior surface 42b of cover 42. In this embodiment, cover 42 may also be free from defining a set of openings 42d since the alternative connector of each alternative retaining mechanism is free from passing through the cover 42. Additionally, each alternative retaining mechanism includes a receiver that is substantially similar to receiver 46b in that alternative receiver is defined or engaged with breaching expendable 144 and is configured to engage with alterative connector. Such alternative configuration may be desired since the kit has a reduced number of parts as well as the cover 42 having a continuous, uninterrupted exterior surface 42a to suppress electromagnetic detection, optical detection, or other environment interface of the plurality of countermeasure expendables 7 disposed inside of a dispenser and a magazine.

It should be understood that the suppression kits 40, 140 discussed herein may be configured to suppress any suitable electromagnetic energy or signals from entering into the dispenser assemblies 20, 120 and the magazines 30, 130. In one example, suppression kits 40, 140 may be configured to suppress radar energy or signals from entering into the dispenser assemblies 20, 120 and the magazines 30, 130. In this example, covers 42, 142 of the suppression kits 40, 140 and the connectors 46, 146 of the suppression kits 40, 140 are covered with radar absorbing material conventionally used in the art to suppress radar energy or signals from entering into the dispenser assemblies 20, 120 and the magazines 30, 130.

Figure 9:
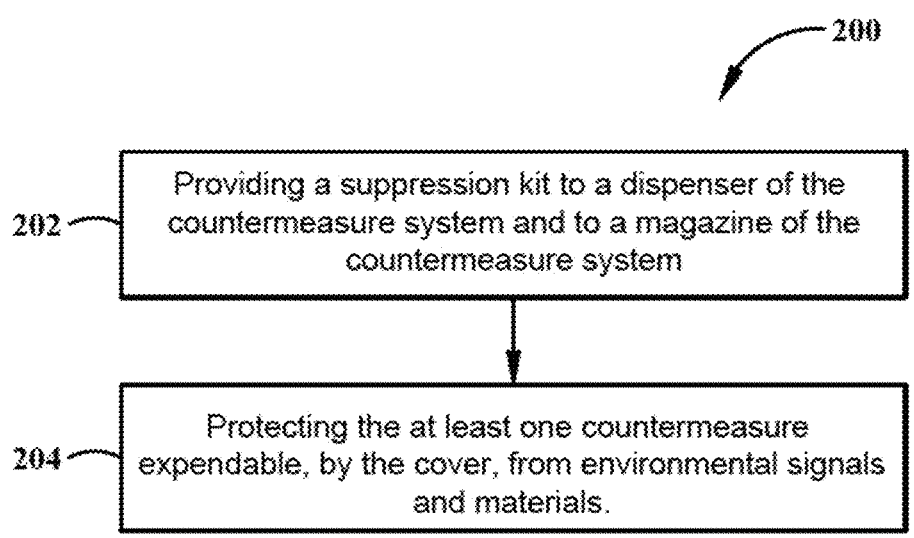
FIG. 9 is a flowchart showing a method of protecting a countermeasure system.

FIG. 9 is a method 200 of protecting a countermeasure system. An initial step 202 of method 200 includes providing a suppression kit to a dispenser of the countermeasure system and to a magazine of the countermeasure system, the suppression kit comprises: a breaching expendable adapted to be stored inside of the magazine of the countermeasure system; and a cover operably engaged with the breaching expendable, wherein the breaching expendable is configured to eject the cover from the dispenser prior to ejection of at least one countermeasure expendable of a set of countermeasure expendables. Another step 204 of method 200 includes protecting the at least one countermeasure expendable, by the cover, from environmental signals and materials.

In other exemplary embodiments, method 100 may include additional or optional steps. In one exemplary embodiment, method 100 may further include steps of positioning a first end of the breaching expendable inside of the magazine; positioning a second end of the breaching expendable inside of the magazine; wherein the second end is longitudinally opposite to the first end; and engaging the second end of the breaching expendable to the cover. In another exemplary embodiment, method 100 may further include steps of positioning a first end of the breaching expendable inside of the magazine; positioning a second end of the breaching expendable outside of the magazine; wherein the second end is longitudinally opposite to the first end; and engaging the second end of the breaching expendable to the cover; wherein the cover directly abuts the dispenser and the magazine is recessed inside of the dispenser. In one exemplary embodiment, method 100 may further include a step of engaging the cover and the breaching expendable with one another by a retaining mechanism.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. As another example, "at least one of: A, B, or B" is intended to cover A, B, C, A-B, A-C, B-C, and A-B-C, as well as any combination with multiple of the same item.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A suppression kit for a countermeasure system, the suppression kit comprising:
   a breaching expendable adapted to be stored inside of a magazine of the countermeasure system; and
   a cover operably engaged with the breaching expendable;
   wherein the cover is configured to suppress is configured to suppress one or more of electromagnetic signals, visual views, and environmental signals from penetrating into a dispenser of the countermeasure system; and
   wherein the breaching expendable is configured to eject the cover from the dispenser prior to ejection of at least one countermeasure expendable of a set of countermeasure expendables.

2. The suppression kit of claim 1, wherein the breaching expendable comprises:
   a first end housed inside of the magazine; and
   a second end longitudinally opposite to the first end and operably engaged with the cover, wherein the second end is housed inside of the magazine;
   wherein the cover directly abuts the magazine and the dispenser.

3. The suppression kit of claim 1, wherein the breaching expendable comprises:
   a first end housed inside of magazine; and
   a second end longitudinally opposite to the first end and operably engaged with the cover, wherein the second end is housed outside of the magazine;
   wherein the cover directly abuts the dispenser and the magazine is recessed inside of the dispenser.

4. The suppression kit of claim 1, wherein the suppression kit further comprises:
   a retaining mechanism operably engaging the cover and the breaching expendable with one another.

5. The suppression kit of claim 1, wherein the suppression kit further comprises:
   a receiver operably engaged with the breaching expendable; and
   a connector operably engaging the cover and the breaching expendable with one another.

6. The suppression kit of claim 5, wherein the suppression kit further comprises:
   an opening defined in the cover; and
   a mating component of the receiver aligned with the cover.

7. The suppression kit of claim 5, wherein the connector threadably engages with the receiver.

8. The suppression kit of claim 1, wherein the cover is covered with an electromagnetic absorbing material or comprises an electromagnetic absorbing material.

9. The suppression kit of claim 1, wherein the suppression kit further comprises:
   an exterior surface of the cover adapted to be in communication with an exterior environment;
   an interior surface of the cover opposite to the exterior surface and is free from being in communication with the exterior environment; and
   a connector extending from the interior surface and engaging the cover and the breaching expendable with one another;
   wherein the connector is concealed from the exterior environment.

10. The suppression kit of claim 1, wherein the cover is configured to be flush with a wall of a platform when installed.

11. A suppression kit for a countermeasure system, the suppression kit comprising:
    a plurality of breaching expendables adapted to be stored inside of a magazine of the countermeasure system; and
    a cover operably engaged with each breaching expendable of the plurality of breaching expendables;
    wherein the cover is configured to suppress is configured to suppress one or more of electromagnetic signals, visual views, and environmental signals from penetrating into a dispenser of the countermeasure system; and
    wherein each breaching expendable is configured to eject the cover from the dispenser prior to ejection of at least one countermeasure expendable of a set of countermeasure expendables.

12. The suppression kit of claim 11, wherein each breaching expendable of the plurality of breaching expendables comprises:
    a first end housed inside of the magazine; and
    a second end longitudinally opposite to the first end and operably engaged with the cover, wherein the second end is housed inside of the magazine;
    wherein the cover directly abuts the magazine and the dispenser.

13. The suppression kit of claim 11, wherein each breaching expendable of the plurality of breaching expendables comprises:
    a first end housed inside of magazine; and a second end longitudinally opposite to the first end and operably engaged with the cover, wherein the second end is housed outside of the magazine;

wherein the cover directly abuts the dispenser and the magazine is recessed inside of the dispenser.

14. The suppression kit of claim 11, wherein the suppression kit further comprises:

a retaining mechanism operably engaging the cover and the plurality of breaching expendables with one another.

15. The suppression kit of claim 13, wherein the suppression kit further comprises:

a receiver operably engaged with each breaching expendable of the plurality of breaching expendables; and a connector operably engaging the cover and a respective breaching expendable with one another.

16. The suppression kit of claim 11, wherein the cover is covered with an electromagnetic absorbing material or comprises an electromagnetic absorbing material.

17. A method of protecting a countermeasure system from environmental signals and materials, comprising:

providing a suppression kit to a dispenser of the countermeasure system and to a magazine of the countermeasure system, the suppression kit comprising:

a breaching expendable adapted to be stored inside of the magazine of the countermeasure system; and a cover operably engaged with the breaching expendable, wherein the breaching expendable is configured to eject the cover from the dispenser prior to ejection of at least one countermeasure expendable of a set of countermeasure expendables; and protecting the at least one countermeasure expendable, by the cover, from environmental signals and materials.

18. The method of claim 17, further comprising:

positioning a first end of the breaching expendable inside of the magazine;

positioning a second end of the breaching expendable inside of the magazine;

wherein the second end is longitudinally opposite to the first end; and engaging the second end of the breaching expendable to the cover.

19. The method of claim 17, further comprising:

positioning a first end of the breaching expendable inside of the magazine;

positioning a second end of the breaching expendable outside of the magazine;

wherein the second end is longitudinally opposite to the first end; and engaging the second end of the breaching expendable to the cover;

wherein the cover directly abuts the dispenser and the magazine is recessed inside of the dispenser.

20. The method of claim 17, further comprising:

engaging the cover and the breaching expendable with one another by a retaining mechanism.

* * * * *